United States Patent
Leblanc et al.

(10) Patent No.: US 6,854,257 B2
(45) Date of Patent: Feb. 15, 2005

(54) SYSTEM FOR INJECTING FUEL INTO A TURBOMACHINE

(75) Inventors: Pascal Leblanc, La Grande Paroisse (FR); Pascal Marly, Melun (FR); José Rodrigues, Nandy (FR); Alain Tiepel, Chailly En Biere (FR)

(73) Assignee: Hispano-Suiza, Colombes (FR)

( * ) Notice: Subject to any disclaimer, the term of this patent is extended or adjusted under 35 U.S.C. 154(b) by 181 days.

(21) Appl. No.: 10/294,633

(22) Filed: Nov. 15, 2002

(65) Prior Publication Data

US 2003/0094197 A1 May 22, 2003

(30) Foreign Application Priority Data

Nov. 19, 2001 (FR) .................................. 01 14908

(51) Int. Cl.⁷ .................................. F02C 9/28
(52) U.S. Cl. .......................... 60/39.281; 60/734
(58) Field of Search ................ 60/39.281, 734; 137/99

(56) References Cited

U.S. PATENT DOCUMENTS

| 796,724 A | | 8/1905 | Hewitt |
| 2,566,734 A | * | 9/1951 | Lawrence et al. ............ 137/99 |
| 2,599,680 A | * | 6/1952 | Weeks ......................... 137/99 |
| 4,328,824 A | | 5/1982 | Kiernan et al. |
| 4,531,535 A | | 7/1985 | Kiernan et al. |
| 2001/0022079 A1 | | 9/2001 | Blot-Carretero et al. |

FOREIGN PATENT DOCUMENTS

EP          0 802 310 A2      10/1997

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A system for injecting fuel into a turbomachine comprising N fuel injectors placed in a combustion chamber of the turbomachine and fed from a fuel tank, the injection system further comprising, interposed between the N injectors and the tank, a single pumping means for taking fuel from the tank and delivering N metered flow rates of fuel to the injectors.

19 Claims, 3 Drawing Sheets

SYSTEM FOR INJECTING FUEL INTO A TURBOMACHINE

BACKGROUND OF THE INVENTION

The present invention relates to the general field of systems for injecting fuel into a combustion chamber in a turbomachine. It relates more particularly to fuel pump means fitted to such injection systems.

As shown diagrammatically in FIG. 5, a system for injecting fuel into a turbomachine typically comprises: a pump 102, e.g. a gear pump, driven by a motor (not shown) enabling fuel to be taken from a fuel tank 104; a plurality of injectors 106 placed in a combustion chamber of the turbomachine and each provided with a fuel metering valve 108; and a fuel metering device 110 interposed between these two sets of elements in order to control the rate at which fuel is to flow from the pump to the injectors. The excess fuel coming from the metering device 110 is reinjected to the inlet of the pump 102.

With such a configuration, the rate at which fuel is injected into the combustion chamber of the turbomachine depends in particular on the setting of each injector 106, on the coking which forms on the nose of each injector, and on the differences in height between the injectors inside the combustion chamber. Furthermore, friction between the metering valve 108 of each injector 106 and a bushing in which it slides gives rise to hysteresis phenomena causing the metering valves to open and close after a delay. As a result fuel injection into the combustion chamber is non-uniform, and that can give rise in particular to difficulties in lighting the turbomachine.

OBJECT AND SUMMARY OF THE INVENTION

The present invention thus seeks to mitigate such drawbacks by proposing a novel system for injecting fuel into a turbomachine, making it possible to simplify the hydraulic circuit by eliminating the metering valves of the injectors and the fuel metering device, and also reducing non-uniformity in the rate at which fuel is injected into each injector.

To this end, the invention provides a system for injecting fuel into a turbomachine having N fuel injectors placed in a combustion chamber of the turbomachine and fed from a fuel tank, the system further comprising, interposed between said N injectors and said tank, a single pumping means for taking fuel from the tank and delivering N metered fuel flows to the injectors.

The single pumping means makes it possible both to take fuel from the fuel tank and to split the fuel flows taken in this way into as many metered fuel flows as there are injectors. As a result, the pump, the metering valves of the injectors, and the fuel metering device of the prior art are all eliminated and replaced by the single pumping means of the invention, thus making it possible to eliminate problems generated by those elements (hysteresis phenomenon, . . . ). The injection of fuel into the combustion chamber of the turbomachine is thus improved.

The metered fuel flows are preferably at identical rates for all N injectors. Means for adjusting these metered flow rates may also be provided.

The single pumping means comprises an assembly formed by: a drive shaft having a longitudinal axis and fitted with N same-diameter drive gears; a driven shaft of longitudinal axis parallel to the longitudinal axis of the drive shaft, provided with N same-diameter driven gears meshing with said N drive gears; and N-1 sealing partitions placed transversely between pairs of adjacent gears on the drive and driven shafts so as to define N fuel admission zones and N fuel delivery zones situated on either side of a longitudinal plane containing the longitudinal axes of the drive and driven shafts, said N fuel admission zones communicating with one another via holes pierced through the sealing partitions; said assembly being fitted longitudinally in leak-tight manner in a cylindrical body having at least one fuel admission orifice connected to the tank and opening out into any one of the two admission zones, and N fuel delivery orifices each opening out into a respective one of the N fuel delivery zones to feed each of the N injectors.

Advantageously, the driven and drive gears are of the same diameter. The drive shaft is rotated by drive means and the means for adjusting the metered flow rates comprise a variable speed device acting on the speed of rotation of said shaft.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF AN EMBODIMENT

Figure 1:
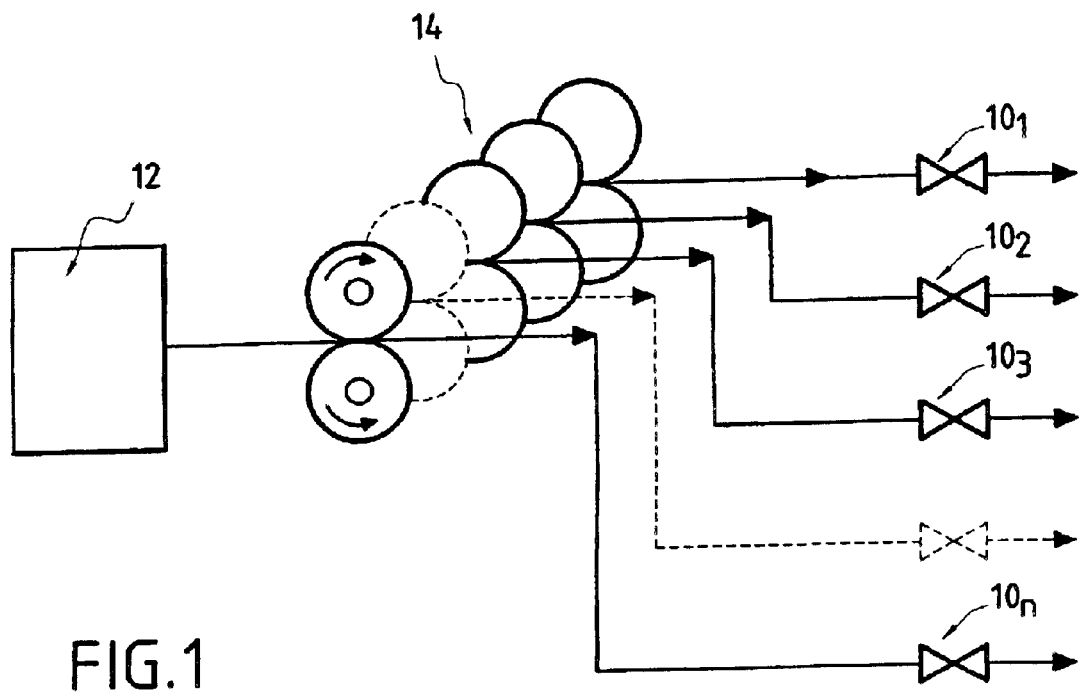
FIG. 1 is a diagram of the hydraulic circuit of a fuel injection system of the invention.
Figure 5:
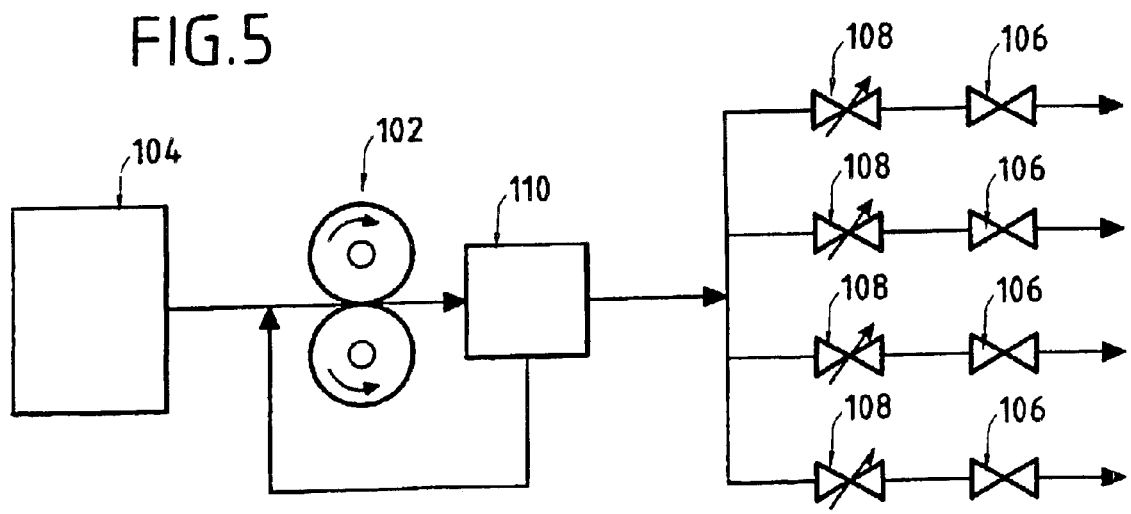
FIG. 5 is a diagram of the hydraulic circuit of a prior art system for injecting fuel into a turbomachine.

Reference is made initially to FIG. 1 which is a diagram showing the hydraulic circuit of the fuel injection system of the invention.

In this figure, there can be seen a system for injecting fuel into a turbomachine having N injectors $10_1$ to $10_N$ (only four are shown in FIG. 1) disposed in a combustion chamber (not shown) of the turbomachine. The injectors $10_1$ to $10_N$ are fed with fuel from a fuel tank 12. A single pumping means 14 is interposed between the N injectors $10_1$ to $10_N$ and the fuel tank 12 so as to take fuel from the tank and deliver fuel to the injectors in N metered flows that are preferably all at the same rate. In a single action, the single pumping means 14 serves both to pump the fuel from the tank and to deliver the fuel as pumped in this way to the N injectors. The fuel is also delivered in such a manner as to meter the N flow rates delivered to the injectors $10_1$ to $10_N$.

Figure 2:
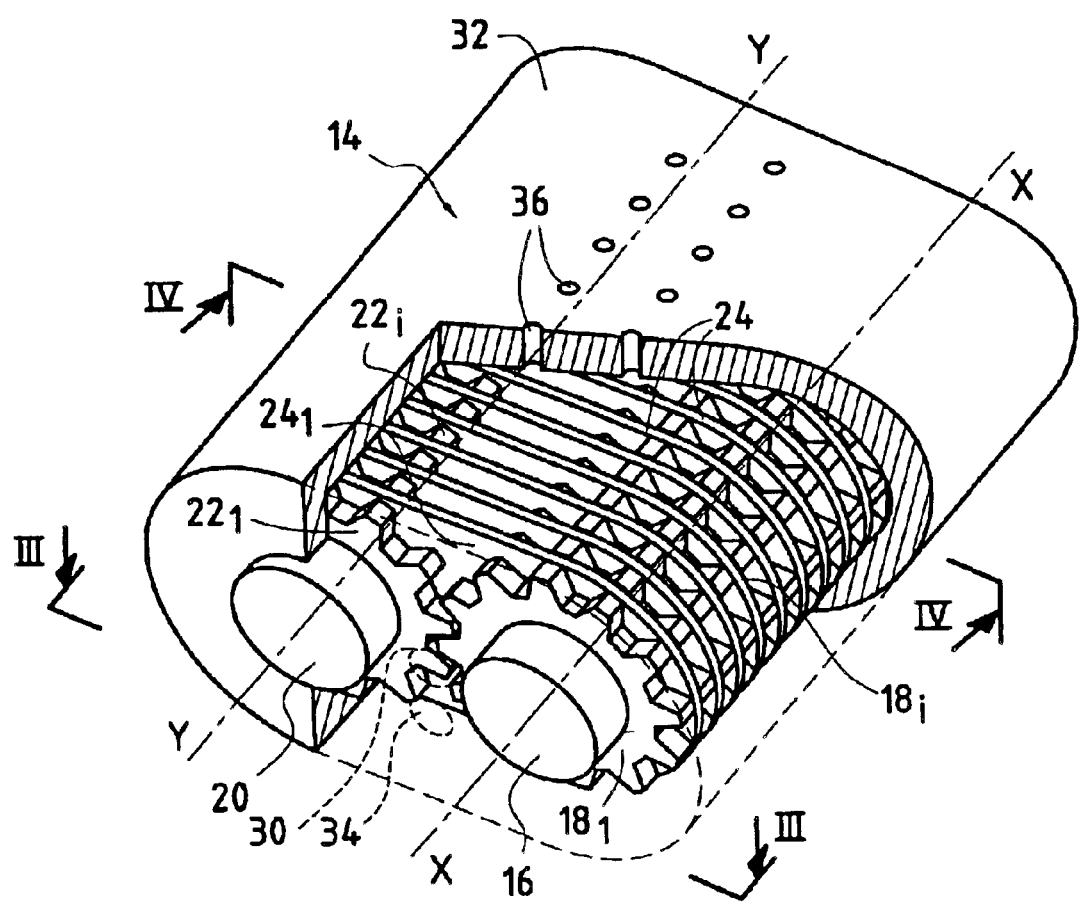
FIG. 2 is a cutaway perspective view of the single measuring pumping means of the fuel injection system of the invention.
Figure 4:
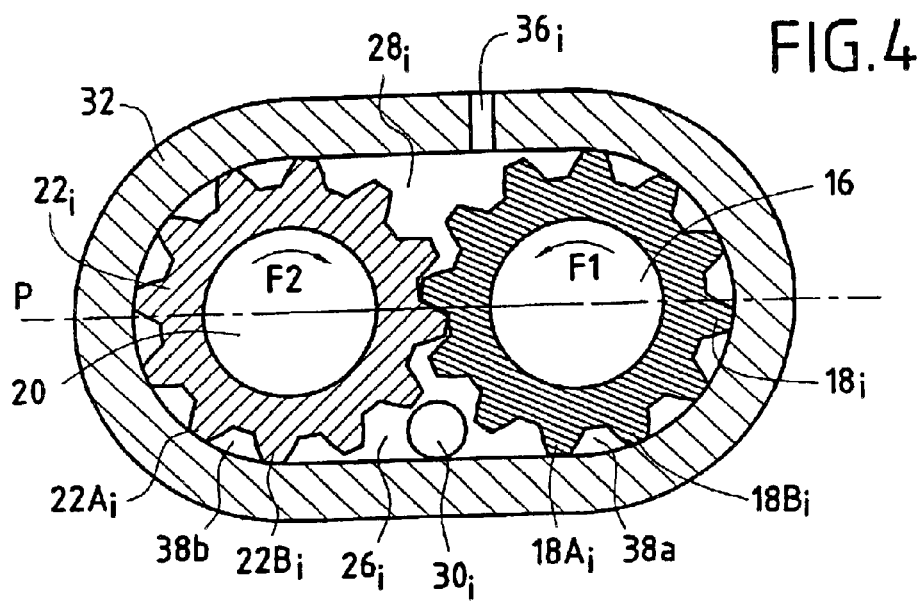
FIG. 4 is a section view on plane IV—IV of FIG. 2.
Figure 3:
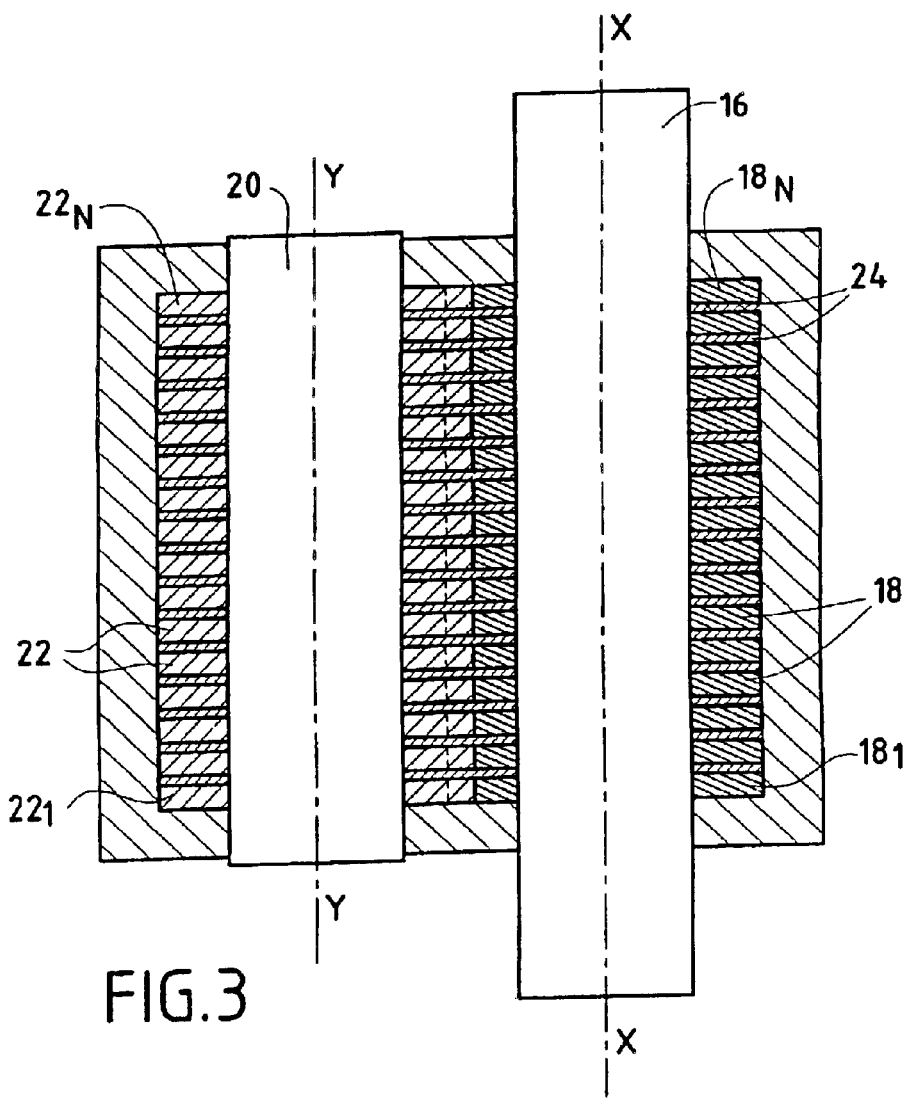
FIG. 3 is a section view on plane III—III of FIG. 2.

FIGS. 2 to 4 show the single pumping means 14 constituting a particular embodiment of the present invention in greater detail. The single pumping means 14 is constituted in particular by an assembly comprising a drive shaft 16 having a longitudinal axis X—X carrying N same-diameter drive gears $18_1$ to $18_N$, and a driven shaft 20 of longitudinal axis Y—Y parallel to the axis of the drive shaft 16. The driven shaft 20 likewise has N same diameter driven gears $22_1$ to $22_N$ arranged in such a manner as to mesh with the N drive gears $18_1$ to $18_N$. The N driven gears $22_1$ to $22_N$ are preferably of identical diameter to the N drive gears $18_1$ to $18_N$. By means of this meshing between the drive and driven gears, rotation of the drive shaft 16 drives rotation of the driven shaft 20 in the opposite direction.

N-1 sealing partitions $24_1$ to $24_{N-1}$ are placed transversely between pairs of adjacent gears on each of the drive and driven shafts. More precisely, the sealing partitions $24_1$ to $24_{N-1}$ are interposed perpendicularly to the longitudinal axes of the drive and driven shafts between successive gear pairs each comprising a drive gear and a driven gear. The sealing partitions $24_1$ to $24_{N-1}$ serve to define N fuel admission zones $26_1$ to $26_N$ and N fuel delivery zones $28_1$ to $28_N$ situated on opposite sides of a longitudinal plane P containing the longitudinal axis X—X and Y—Y of the drive and driven shafts. Each meshed pair of drive and driving gears $18_i/22_i$ (where i lies in the range 1 to N) thus corresponds to a fuel admission zone $26_i$ and to a fuel delivery zone $28_i$ situated on opposite side of the longitudinal plane P. As shown in FIG. 4, N-1 holes $30_1$ to $30_{N-1}$ pierced through the sealing partitions $24_1$ to $24_{N-1}$ enable the N fuel admission zones $26_1$ to $26_N$ to communicate with one another.

The assembly comprising the drive and driven shafts 16 and 20 and the N sealing partitions $24_1$ to $24_{N-1}$ is fitted longitudinally in leaktight manner in a cylindrical body 32 of oblong section. The term "fitted longitudinally" is used to mean that the cylindrical body 32 presents a right cross-section of dimensions that are matched to the distance between the axes and to the diameter(s) of the meshing drive and driven gears.

At least one fuel admission orifice is formed through the cylindrical body 32 of the single pumping means. It is connected to the fuel tank 12 and opens out into any one of the fuel admission zones $26_1$ to $26_N$. By way of example, and as shown in FIG. 2, a single fuel admission orifice 34 is pierced through one end of the cylindrical body and opens out into a first fuel admission zone $26_1$.

The cylindrical body 32 of the single pumping means further comprises N fuel delivery orifices $36_1$ to $36_N$ each opening out into a respective one of the N fuel delivery zones $28_1$ to $28_N$. According to an advantageous characteristic of the invention, the N delivery orifices $36_1$ to $36_N$ are aligned in a zigzag configuration on two longitudinal rows parallel to the longitudinal axes X—X and Y—Y of the drive and driven shafts.

The operation of the single pumping means 14 is described below with reference more particularly to FIG. 4.

The drive shaft 16 is rotated in the direction marked by arrow F1 by motor means (not shown in the figures), e.g. an electric motor. The N drive gears $18_1$ to $18_N$ then mesh with the N driven gears $22_1$ to $22_N$ thus causing the driven shaft 20 to rotate in the opposite direction (marked by arrow F2). This rotation of the drive and driven shafts has the effect of drawing in fuel from the fuel tank 12 via the fuel admission orifice 34 connected thereto, and of bringing the fuel into the fuel admission zone $26_1$ into which this fuel admission orifice opens out. The fuel then penetrates into all of the N fuel admission zones $26_1$ to $26_N$ by passing through the N-1 holes $30_1$ to $30_{N-1}$ pierced through the N-1 sealing partitions $24_1$ to $24_{N-1}$. The fuel present in each of the N fuel admission zones 26i is then moved into the corresponding fuel delivery zone $28_i$ by means of the corresponding pair of drive and driven gears $18_i/22_i$. More precisely, a metered quantity Q of fuel present in one of the admission zones is received in an intermediate zone 38a, 38b lying between two adjacent teeth $18A_i$, $18B_i$ of one of the drive gears $18_i$ and between two adjacent teeth $22A_i$, $22B_i$ of the driven gear $22_i$ meshing with said drive gear. This metered quantity Q of fuel is then moved towards the corresponding delivery zone under the effect of the drive/driven pair of gears rotating and is evacuated via the corresponding delivery orifice $36_i$ leading to one of the N injectors $10_1$ to $10_N$. Thus, the single pumping means 14 serves to deliver fuel in N metered flow rates to the injectors.

When the N driven gears $22_1$ to $22_N$ are identical in diameter to the N drive gears $18_1$ to $18_N$, they also have identical respective numbers of teeth. This means that the quantity of fuel delivered through the corresponding delivery orifice $36_i$ corresponds, for one revolution of the gears, to approximately twice the metered quantity Q of fuel present in one of the intermediate zones 38a, 38b multiplied by the number of teeth. This metered quantity Q of fuel depends in particular on the distance between two adjacent teeth and on the height between the root and the tip of each tooth.

According to an advantageous characteristic of the invention, the fuel injection system further comprises means for adjusting the metered flow rates delivered to the N injectors. These adjustment means are in the form of a variable speed device (not shown in the figures) acting on the speed of rotation of the drive shaft. The metered flow rate of fuel delivered to each injector $10_1$ to $10_N$ is thus proportional to the metered quantity Q of fuel and to the speed of rotation of the drive shaft 16.

The single pumping means 14 is described above in an embodiment comprising a system of meshing drive and driven gears. Naturally, the single pumping means could be implemented using other types of meshing member. For example, it will be possible to use meshing rollers carried by the drive and driven shafts, the operating principle remaining identical.

What is claimed is:

1. A system for injecting fuel into a turbomachine having N fuel injectors placed in a combustion chamber of the turbomachine and fed from a fuel tank, the system further comprising, interposed between said N injectors and said tank, a single pumping means for taking fuel from the tank and delivering N metered fuel flows to the injectors, wherein said single pumping means comprises an assembly formed by:

a drive shaft having a longitudinal axis and fitted with N same-diameter drive gears:

a driven shaft of longitudinal axis parallel to the longitudinal axis of the drive shaft. provided with N same-diameter driven gears meshing with said N drive gears; and N-1 sealing partitions placed transversely between pairs of adjacent gears on the drive and driven shafts so as to define N fuel admission zones and N fuel delivery zones situated on either side of a longitudinal plane containing the longitudinal axes of the drive and driven shafts, said N fuel admission zones communicating with one another via holes pierced through the sealing partitions;

said assembly being fitted longitudinally in leaktight manner in a cylindrical body having at least one fuel admission orifice connected to the tank and opening out into any one of the admission zones, and N fuel delivery orifices each opening out into a respective one of the N fuel delivery zones to feed each of the N injectors.

2. A fuel injection system according to claim 1, wherein the N metered fuel flows are at identical rates.

3. A fuel injection system according to claim 1, further comprising means for adjusting the rates of the metered fuel flows.

4. A fuel injection system according to claim 1, wherein the N driven gears are identical in diameter to the N drive gears.

5. A fuel injection system according to claim 1, wherein the delivery orifices are aligned in a zigzag configuration on two longitudinal rows parallel to the longitudinal axes of the drive and driven shafts.

6. A fuel injection system according to claim 1, wherein the cylindrical body of the single pumping means has a single fuel admission orifice pierced through one end thereof.

7. A fuel injection system according to claim 1, wherein the drive shaft is driven in rotation by motor means.

8. A fuel injection system according to claim 7, wherein the means for adjusting the metered flow rates of fuel comprises a variable speed device acting on the speed of rotation of the drive shaft.

9. A system for injecting fuel into a turbomachine having N fuel injectors fed from a fuel tank, the system comprising, interposed between said N injectors and said fuel tank, a pump configured to pump fuel from the fuel tank and deliver N fuel flows to the fuel injectors, wherein said pump comprises an assembly comprising:

a drive shaft coupled to N drive gears;

a driven shaft provided with N driven gears meshing with said N drive gears; and sealing partitions placed between pairs of adjacent gears on the drive and driven shafts so as to define N fuel admission zones and N fuel delivery zones, said N fuel admission zones communicating with one another;

said assembly being located in a body having at least one fuel admission orifice connected to the fuel tank and opening out into any one of the N fuel admission zones, and N fuel delivery orifices each opening out into a respective one of the N fuel delivery zones to feed each of the N injectors.

10. A fuel injection system according to claim 9, wherein said pump is a single pumping means for pumping said fuel and for delivering said N fuel flows.

11. A fuel injection system according to claim 9, wherein said N fuel flows delivered by said pump are metered.

12. A fuel injection system according to claim 9, wherein said drive shaft is fitted with said N drive gears and said N drive gears are of a same diameter.

13. A fuel injection system according to claim 9, wherein said drive shaft has a longitudinal axis and said driven shaft has a longitudinal axis parallel to the longitudinal axis of the drive shaft.

14. A fuel injection system according to claim 9, wherein said N driven gears of said driven shaft are of a same diameter.

15. A fuel injection system according to claim 9, wherein said pump comprises N-1 of said sealing partitions, and said sealing partitions are placed transversely between said pairs.

16. A fuel injection system according to claim 13, wherein said N fuel admission zones and said N fuel delivery zones are situated on either side of a longitudinal plane containing the longitudinal axes of the drive and driven shafts.

17. A fuel injection system according to claim 9, wherein said N fuel admission zones communicate with one another via holes pierced through the sealing partitions.

18. A fuel injection system according to claim 9, wherein said assembly is fitted longitudinally in leaktight manner in said body.

19. A fuel injection system according to claim 9, wherein said body is cylindrical.

* * * * *